(12) United States Patent
Hall

(10) Patent No.: US 9,309,993 B2
(45) Date of Patent: Apr. 12, 2016

(54) ANTI-LIGATURE FLUSH VALVE COVER

(71) Applicant: Kingsway Group Inc., Indianapolis, IN (US)

(72) Inventor: Benjamin Mark Hall, Indianapolis, IN (US)

(*) Notice: Subject to any disclaimer, the term of this patent is extended or adjusted under 35 U.S.C. 154(b) by 265 days.

(21) Appl. No.: 14/154,718

(22) Filed: Jan. 14, 2014

(65) Prior Publication Data

US 2015/0197927 A1  Jul. 16, 2015

(51) Int. Cl.
*E03D 1/012* (2006.01)
*F16K 51/00* (2006.01)
*E03D 1/01* (2006.01)
*E03D 5/00* (2006.01)

(52) U.S. Cl.
CPC . *F16K 51/00* (2013.01); *E03D 1/01* (2013.01); *E03D 1/012* (2013.01); *E03D 5/00* (2013.01); *Y10T 137/7062* (2015.04)

(58) Field of Classification Search
CPC ......... E03D 1/01; E03D 1/012; E03D 1/0125; E03D 5/00

USPC ....................... 137/377; 4/DIG. 15
See application file for complete search history.

(56) References Cited

U.S. PATENT DOCUMENTS

| 838,601 | A | * | 12/1906 | Willms | 4/416 |
| 4,030,145 | A | * | 6/1977 | Rowan | 4/664 |
| 4,558,472 | A | * | 12/1985 | Fromme et al. | 4/252.3 |
| 5,251,340 | A | * | 10/1993 | Su-Land | 4/304 |
| 5,396,667 | A | * | 3/1995 | Egli et al. | 4/419 |
| 2006/0085901 | A1 | * | 4/2006 | Janssen | 4/354 |
| 2011/0174392 | A1 | * | 7/2011 | deLoache, III et al. | 137/377 |

* cited by examiner

*Primary Examiner* — Kevin Murphy
(74) *Attorney, Agent, or Firm* — Woodard, Emhardt, Moriarty, McNett & Henry LLP

(57) ABSTRACT

There are disclosed embodiments for an anti-ligature flush valve cover. For example, a one-piece flush valve cover is mounted to a solid surface using internal brackets to completely cover a toilet flush valve. A portion of the bracket is recessed from parts that contact the interior of the cover, so that a connector inserted into an opening on the bracket surface contacts the opening spaced away from the interior of the flush valve cover. The cover has a bottom edge that does not extend beyond the edges of the toilet fixture. Structure for a push button assembly for flushing the toilet is also disclosed.

15 Claims, 6 Drawing Sheets

ANTI-LIGATURE FLUSH VALVE COVER

The present disclosure concerns a system for covering a toilet flush valve so that ligature dangers are reduced or eliminated. In particular, the present disclosure concerns a cover that has particular advantages in removing ligature hazard while permitting easy access to authorized persons for maintenance or other reasons.

BACKGROUND

There are environments where there is a danger that occupants or inhabitants might accidentally injure themselves or may try to cause harm to themselves or others, such as hospitals (in particular mental health wards or institutions) or prisons. Steps are taken in such environments with the goal of reducing potential harm or risk of such occurrences, e.g. by renovation or refurbishment, or by building and furnishing with such risk reduction in mind. For example, structures and furnishings made of soft materials and/or having rounded edges to reduce potential for serious injury may be used. Particular focus may be on surfaces or structures on which clothing or other flexible materials may be draped or wrapped and which may then present a risk of ligature (i.e. "ligature points"), and consideration may be given to reducing or eliminating such risk.

Commercial flush valves for toilets, in particular, present areas (including potential ligature points) on which a person may injure themselves or others. They can be a significant risk due to exposed plumbing, connections, and levers or handles used to operate the valve, which provide several locations that can be used for ligature attachment. Some toilet plumbing designs make valves and/or other plumbing parts unobservable and/or not immediately accessible (e.g. in water tanks in residential examples) for aesthetic purposes, to limit usage of space, and/or to limit damage to parts. The structures that hide such plumbing are not, however, designed to prevent attachment of ligature.

In many cases the toilet flush valve or other working parts are not completely covered, or can easily be accessed. For example, a residential tank or cover may be easily lifted off or otherwise removed for service by the homeowner. As another example, a handle that pivots or is pushed to operate the flush valve is on the outside of a tank. A shroud that has a hole in the side leaving the lever extending for flushing does not remove that area for ligature attachment. Such tanks or similar items are not effective as anti-ligature devices because the handle, or any other exposed or accessible portions of the valve, can provide a ligature point.

A shroud for toilet plumbing shown in U.S. Patent Application Publication No. 2011/0174392 is formed using multiple pieces that are assembled around the plumbing. Although this system may generally hide the flush valve, using multiple pieces necessitates connection points between the pieces on the surface of the cover. Having such connection points increases the risk that one of these connections will fail, allowing access to ligature points within the valve cover. Further, the device is not robust enough for behavioral health care or other facilities that may see violent or suicidal occupants. A person wishing to access the flush valve may able to break the cover or pry the cover open at the seams created by the separate pieces, especially if the surface of the cover is not smooth at the seams. If the seams have space between the respective parts, they may themselves present potential ligature points. Such a device is not easily removed for maintenance purposes as well.

There remains a need for an anti-ligature toilet flush valve cover that greatly alleviates the risk of access to a flush valve by a person unauthorized to have such access.

SUMMARY

Among other things, there is disclosed a system for an anti-ligature toilet flush valve cover for placement above a toilet fixture. For example, the system may include a monolithic hollow flush valve cover that is sized to fit around a toilet flush valve. The valve cover is shaped so that it is wide at the top and narrower at its base. The bottom edge of the flush valve cover rests on the toilet fixture in illustrated embodiments so that no part of the bottom edge overhangs the width of the fixture. The monolithic structure provides safety benefits by eliminating seams and attachment points that increase the risk of gaps or other issues possibly leading to ligature points.

The system includes multiple internal brackets for mounting the cover on a solid surface, such as a wall. Each internal bracket has one side that is mounted to the solid surface and another side that contacts the valve cover when the cover is placed around the toilet valve. The surface that contacts the valve cover has lateral arms and a recessed center panel, so that the center panel is a distance away from the cover. An aperture extends through the surface of the center panel. There is a connector for each of the internal brackets to connect the brackets to the cover. The connectors are adapted for insertion through the cover to engage the center panel of the internal bracket.

In one embodiment, there are three internal brackets used to secure the cover to a solid surface. For example, one of the brackets attaches to the top of the cover and the other two brackets attach internally to the sides of the cover, for example the sides in the narrowed lower portion of the cover.

Thus, among other things there is disclosed an anti-ligature toilet flush valve cover system for placement above a toilet fixture having a bowl and an upper surface adjacent the bowl, which includes a monolithic valve cover, a plurality of internal brackets, and a respective connector for each of the brackets, with a bottom continuous edge defining an area smaller than the upper surface adjacent the bowl of the toilet fixture, so that the cover can be fixed with respect to the toilet fixture such that no portion of the bottom edge extends beyond the upper surface adjacent the bowl of the toilet fixture. In particular embodiments, the valve cover includes a T-shaped front portion having top and bottom parts, an upper portion, and first and second S-shaped side portions, and the top part of the front portion may be wider than the bottom part of the front portion. Each such portion has an interior surface in the illustrated embodiments, defining a hollow interior of the cover.

Embodiments of the brackets for mounting the valve cover to a solid surface can include first and second side panels, a rear panel, and a U-shaped engagement piece extending between the side panels and from the rear panel. The engagement piece in a particular example has two lateral arms and a recessed center panel joined to the lateral arms by side plates, and the lateral arms are adapted to contact the interior surface of one of the side portions or upper portion of the valve cover. The recessed center panel includes an aperture and is offset from the lateral arms by a substantial distance, such as for example at least 5 millimeters, at least 10 millimeters, or approximately 18 millimeters. Embodiments of the connectors are adapted for insertion through the valve cover to engage the aperture in the respective internal bracket a distance within the interior of the valve cover (as indicated above) to attach the valve cover to the internal brackets.

In particular embodiments the bottom edge is a continuous edge including an end of each of the side portions and an end of the front portion. The plurality of internal brackets includes a maximum of three internal brackets in some embodiments, and the brackets may contact the valve cover on the upper portion and at the bottom part of the side portions. Specific examples of the connectors are quarter turn fasteners.

A push button can be positioned through the valve cover and connected to an activation assembly for activating the toilet flush valve. A push button assembly is provided that allows a user to flush the toilet fixture but does not present a potential ligature point. In this embodiment, the cover includes a push button opening that allows installation of the push button assembly. For example, a case for the push button is threaded through the cover, and the activation assembly can include an adjustable extension. Embodiments are disclosed including a pressure plate coupled to a spring-loaded plunger that activates the flush valve, with the adjustable extension connecting to the pressure plate, so that pushing force on the push button is transmitted via the adjustable extension to the pressure plate and plunger. An examples of the adjustable extension include a first threaded shaft connected to a foot and a second threaded shaft connected to the push button, each such shaft having a respective nut whereby the extension can be adjusted. The foot may be movable along the first threaded shaft to provide an additional adjustment for the adjustable extension.

The illustrated embodiment of the valve cover has an upper portion that is at least partly planar, and first and second side portions that each have a first at least partly planar area adjacent the top part of the front portion and a second at least partly planar area adjacent the bottom part of the front portion. A specific example of the valve cover has only four holes through its portions, including first, second and third holes each for accommodating a respective one of the connectors and a fourth hole for accommodating a push button. As illustrated, the first hole is through the first side portion of the valve cover in the planar area adjacent the bottom part of the front portion, the second hole is through the second side portion of the valve cover in the planar area adjacent the bottom part of the front portion, and the third hole is through the planar part of the upper portion of the valve cover. The fourth hole is through the first side portion of the valve cover in the planar area adjacent the top part of the front portion, and a push button mechanism extends through the fourth hole but not presenting a ligature point.

The illustrated embodiment of the valve cover includes a back edge that is continuous and includes an end of each of the side portions and an end of the upper portion. That back edge faces away from the front portion, and is adapted to lie flush against a wall from which the toilet fixture extends when the cover is emplaced. Particular embodiments of the brackets have lateral arms and a rear panel that form an acute internal angle. The valve cover's exterior at the location of the internal brackets forms an obtuse internal angle with the wall. The front portion of the illustrated valve cover is planar and non-perpendicular to the upper portion of the valve cover and to the first and second side portions of the valve cover.

These and other features will be further described below.

DETAILED DESCRIPTION OF THE ILLUSTRATED EMBODIMENTS

Figure 1:
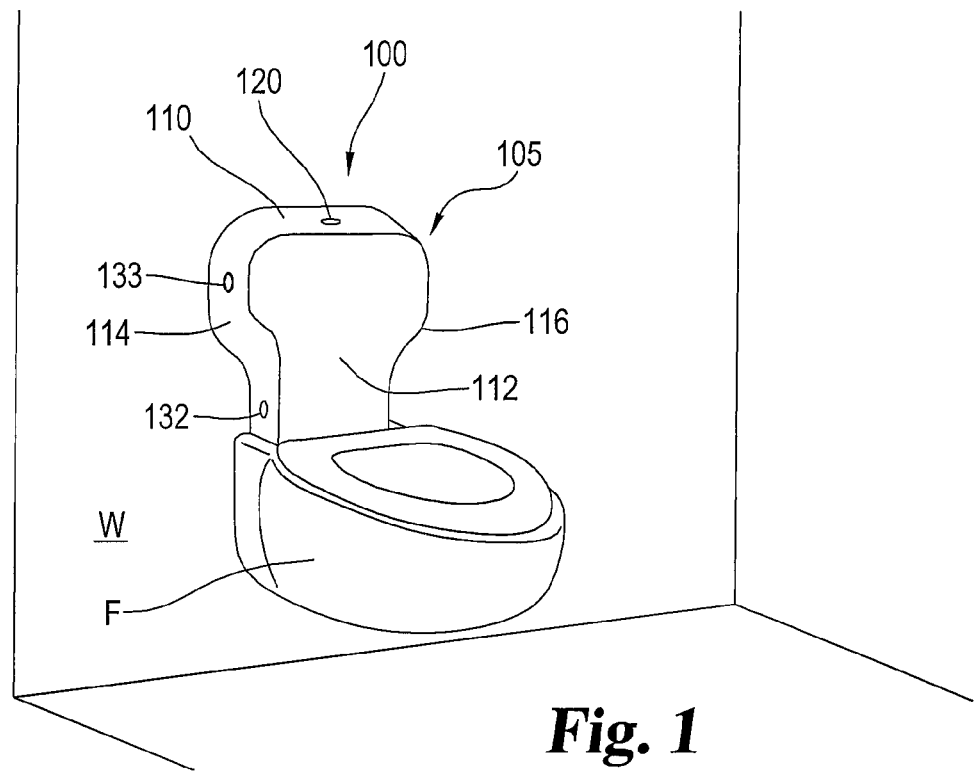
FIG. 1 is a perspective view of an embodiment of an anti-ligature flush valve cover system in use.
Figure 2:
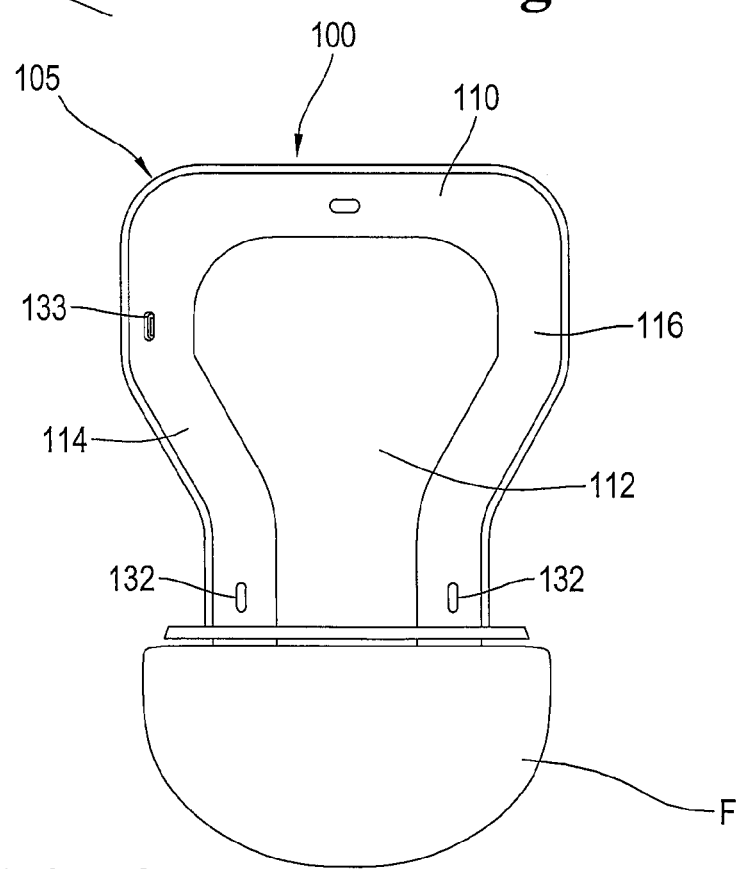
FIG. 2 is a front elevational view of the embodiment shown in FIG. 1.

For the purposes of promoting an understanding of the principles of the disclosure, reference will now be made to the embodiments illustrated in the drawings and specific language will be used to describe the same. It will nevertheless be understood that no limitation of the scope of the claims is thereby intended, such alterations and further modifications in the illustrated embodiments, and such further applications of the principles of the disclosure as illustrated therein being contemplated as would normally occur to one skilled in the art to which the disclosure relates.

Referring now generally to the drawings, there are shown embodiments of an anti-ligature flush valve shroud or cover system 100. System 100 covers the flush valve of a toilet so that the valve is inaccessible and nothing can be draped or hooked over or otherwise attached to either the cover or any part of the valve. In the description below, an exemplary flush valve is a commercially-available valve common in institutional or public settings, e.g. a Sloan model 111, with standard features and fittings.

In the embodiment of FIG. 1, an external view of an embodiment of system 100 is shown. A one-piece anti-ligature flush cover 105 includes an upper side portion 110, a front portion 112, and lateral side portions 114, 116. By "one-piece" is meant a monolithic item (for example, formed from a single workpiece, or from multiple pieces fixed directly together without connecting pieces or fasteners, as by welding or fusing). Cover 105 is hollow, so that each portion 110, 112, 114 and 116 has a respective exterior surface and a respective interior surface, with the collective interior surfaces generally defining an interior volume. As indicated in FIG. 1, the respective interfaces between each such portion are smoothly rounded, leaving no sharp edges on which a person could harm themselves. Cover 105 is made of a rigid material, and in particular embodiments each portion has a thickness sufficient to be strong enough to withstand attempts to break, dent or bend by an individual using his or her hands. For example, in one embodiment, cover 105 is made of stainless steel of about 2 mm uniform thickness throughout.

Figure 3:
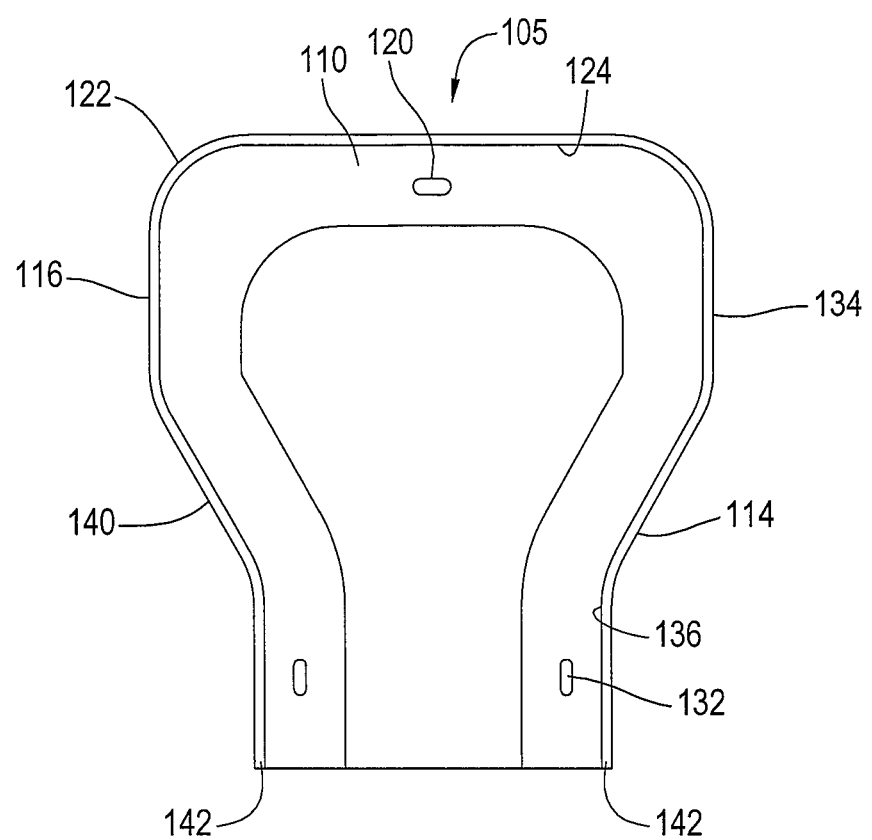
FIG. 3 is a rear elevational view of the embodiment of the cover shown in FIG. 1.

Upper side portion 110 has a substantially planar part or section between rounded interfaces that respectively meet front portion 112 and lateral side portions 114 and 116. An opening 120 is shown evenly spaced between side portions 114 and 116 in this embodiment, and is for connection of cover 105 to a bracket as discussed further below. The plane of the planar section of top side portion 110 intersects the plane of front portion 112 in an obtuse angle, about 105 degrees in the illustrated embodiment. As indicated previously, the thickness of upper side portion 110 is constant in particular embodiments, with its exterior surface 122 parallel to its interior surface 124 (FIG. 3) at all points.

Figure 4:
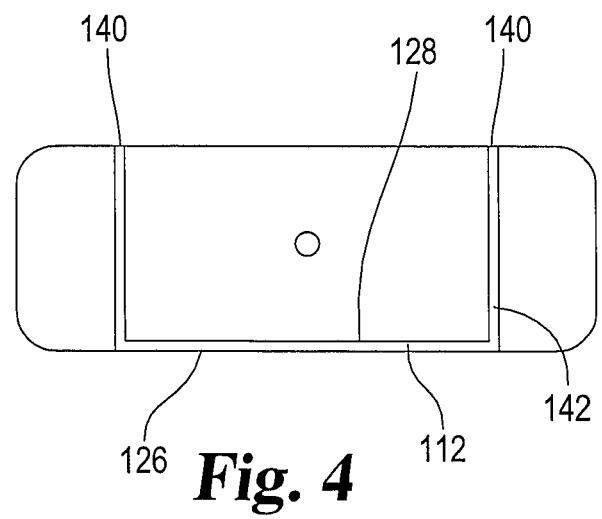
FIG. 4 is a bottom elevational view of the embodiment shown in FIG. 3.

Front portion 112 is in essentially the shape of a T, with a top part (adjacent upper side portion 110) wider than a bottom part (adjacent to toilet fixture F). As seen in the drawings, the top part has a uniform width between side portions 114 and 116, and the bottom part has a smaller uniform width between side portions 114 and 116. Front portion 112 is substantially planar between the rounded interface between it and upper side portion 110 and those between it and lateral side portions 114 and 116. When cover 105 is fixed as indicated below, front portion 112 in this embodiment is parallel to a wall surface to which cover 105 is attached, and abuts and is perpendicular to an upper surface of fixture F. As indicated previously, the thickness of front portion 112 is constant in particular embodiments, with its exterior surface 126 parallel to the interior surface 128 (FIG. 4) at all points.

Lateral side portions 114 and 116 in this embodiment are essentially S-shaped in profile (e.g. FIG. 3) and are mirror images of each other, and so for brevity side portion 114 will be described. Portion 114 includes an upper planar portion adjacent the rounded interface connecting upper side portion 110 and portion 114 and adjacent the rounded interface connecting front portion 112 and portion 114, and a lower planar portion adjacent the rounded interface connecting portion 114 with the narrower lower part of front portion 112. A curved portion joins the upper and lower planar portions of side portion 114, to conform to the general T-shape of front portion 112. The lower planar portion of side portion 114 includes an opening 132 in this embodiment, and is for connection of cover 105 to a bracket as discussed further below. A hole 132 for connection of a flushing button as discussed further below is in the upper planar portion of side portion 114 in this embodiment, but is not similarly placed in side portion 116, as only one flushing button is necessary. It will be understood that hole 132 may be placed in either of lateral side portions 114, 116, depending on the orientation and/or structure of the flush valve V. In this embodiment, the upper and lower planar portions of lateral side portion 114 are in parallel planes, and those respective planes intersect the plane of front portion 112 in an obtuse angle, about 105 degrees in the illustrated embodiment, i.e. the same angle as is between the planes of front portion 112 and that of the planar portion of upper side portion 110. As indicated previously, the thickness of lateral side portions 114, 116 is constant, with its exterior surface 134 parallel to the interior surface 136 (FIG. 3) at all points in this embodiment.

The combination of upper side portion 110 and lateral side portions 114, 116 provide an edge 140, which in this embodiment is continuous (i.e. unbroken) and of uniform thickness and is planar so as to sit flush against a mounting surface, such as a wall W from which toilet fixture F extends. Edge 140 extends around most of the interior volume within cover 105. The combination of the lower part of lateral side portions 114, 116 and the lower part of front portion 112 provide an edge 142, which is also in this embodiment continuous and of uniform thickness and planar so as to sit flush against fixture F. The respective planes of edges 140 and 142 are perpendicular in the illustrated embodiment, and edges 140 and 142 meet each other in two locations. Edge 142 forms a lower end of cover 105 that engages the surface of toilet fixture F, e.g. at the area of fixture F between the bowl and wall W. In the illustrated embodiment, edge 142 is flush with an upper planar surface of fixture F, so that no part of edge 142 extends beyond the extent of fixture F.

As noted previously, three internal brackets 150 are provided to anchor cover 105 to wall W, via the openings 120, 132 in upper side portion 110 and lateral side portions 114, 116. In the illustrated embodiment, each bracket 150 is identical, and is shown in FIGS. 5-9. Bracket 150 in the illustrated embodiment includes two identical side panels 152, a rear or wall panel 154, and an essentially U-shaped engagement piece 156 extending between side panels 152 and extending from rear panel 154.

Side panels 152 are triangular in this embodiment, specifically a non-right or scalene triangle. Each side panel 152 adjoins rear panel 154 at a respective first edge, and each side panel 152 adjoins engagement piece 156 at a respective second edge. The angle between such first and second edges is supplementary to the angle between the lateral sides 114, 116 and front side 112, and/or that between the upper side 110 and front side 112 so that when attached cover 105 is flush (or parallel) with wall W. In the examples given above, where the angles between the sides are 105 degrees, the angle between such first and second edges ($\theta$ in FIG. 8) will be 75 degrees, which will also be the angle between the sides and the wall, since the wall is parallel to the front side 112.

Rear or wall panel 154 is a planar piece so as to lie flush against a planar wall W or other attachment surface, adjoining to side panels 152 and engagement piece 156 as indicated. Rear panel 154 is rectangular with a cut-out 162 to adjoin with the illustrated configuration of engagement piece 156. Holes 164 extend through panel 154 to accommodate fasteners (e.g. screws or bolts). In the illustrated embodiment, three holes 164 are shown, two of which are lateral and outside the long dimension of cut-out 162, and one of which is centered toward a lower end of panel 154. Such placement of holes 164 permits easy access to them (or to fasteners within them) for one attaching or removing bracket 150 to wall W or other support.

Engagement piece 156 includes two lateral arms 170 and a recessed center panel 172 parallel to arms 170 and connected to arms 170 by side plates 173. Arms 170 are planar in this embodiment and extend along respective side panels 152 as indicated. Arms 170 are intended to be flush against a part of the interior surface of one of upper portion 110 or side portions 114, 116. Center panel 172 is recessed or offset in relation to arms 170, creating a cavity 174 so that when arms 170 contact the interior surface of cover 105, cavity 174 separates center panel 172 from the interior surface of cover 105. In the illustrated embodiment, that separation is between one-third and one-half of the width of rear panel 154, and may be greater than 5 millimeters, greater than 10 millimeters, or in a particular embodiment, about 18 millimeters. That substantial space allows a fastener (as disclosed below) to be placed so that cover 105 is securely fastened to bracket 150 while the head of the fastener is at or below the exterior surface of cover 105 to reduce or eliminate ligature risk. An authorized technician can access the fastener from the top, while the actual connection between the fastener and the bracket 150 is held a distance from cover 105. Center panel 172 further includes a main aperture 176 and two lateral apertures 178 in the illustrated embodiment, for connection with a fastener as indicated below.

Figure 5:
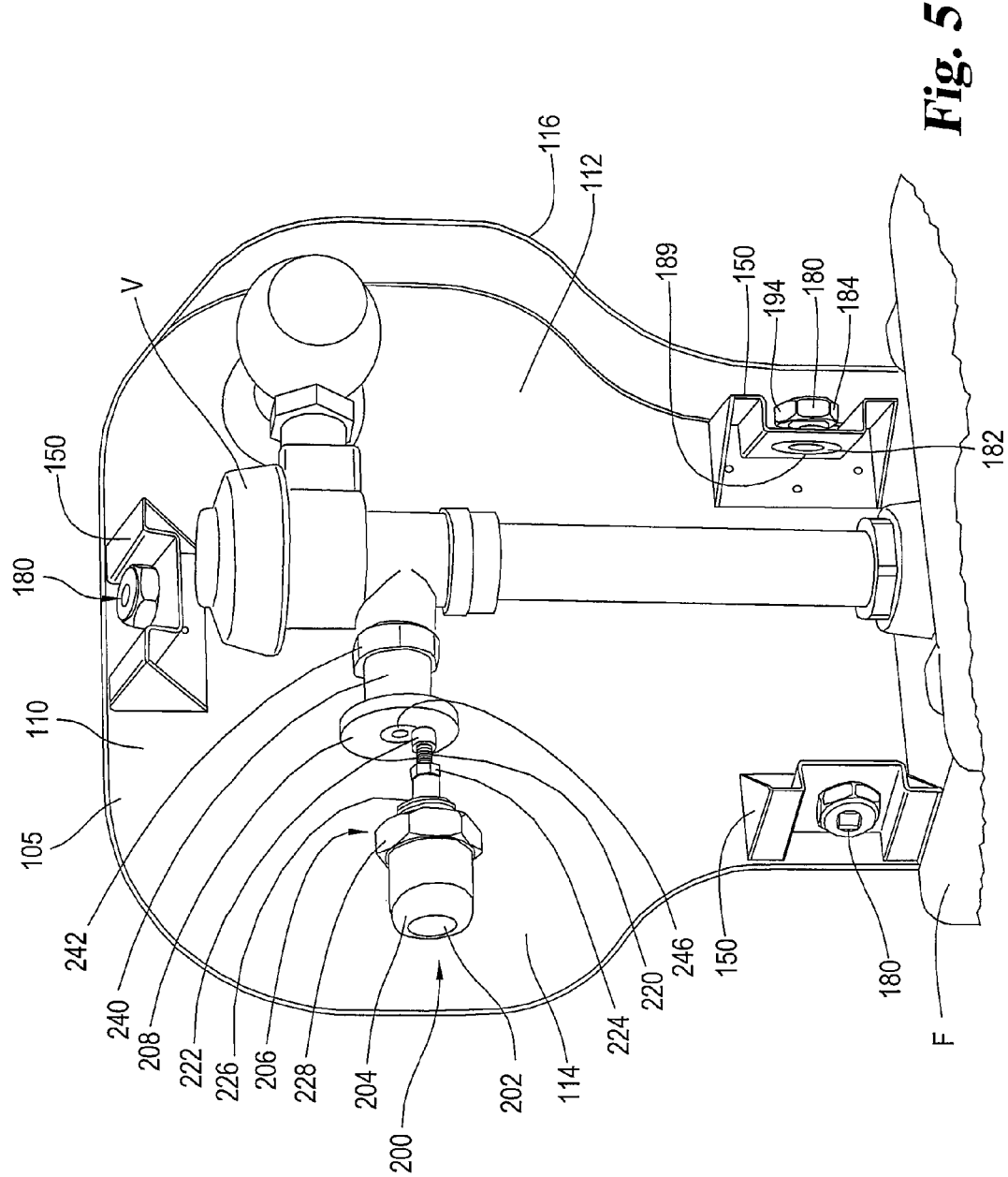
FIG. 5 is a perspective view of the embodiment shown in FIG. 1, with the cover in phantom to show embodiments of structure within.
Figure 6:
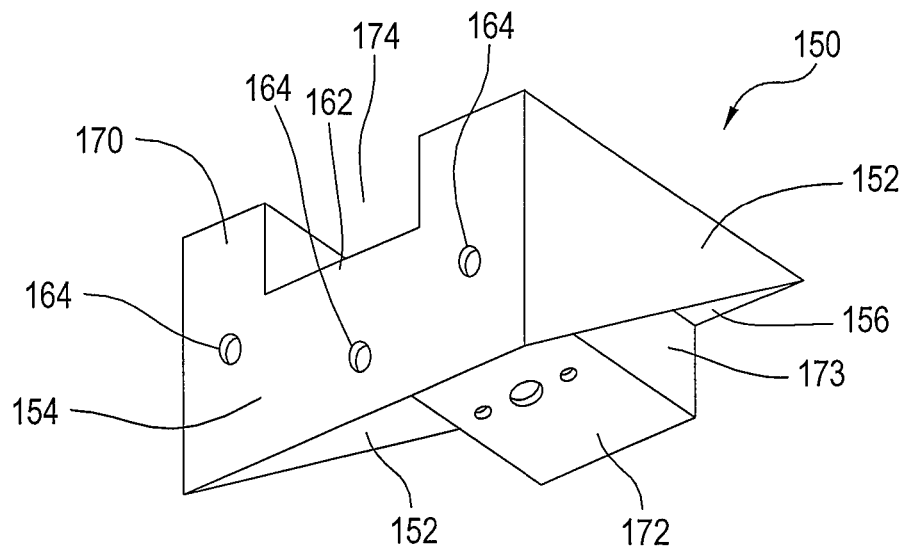
FIG. 6 is a perspective view of an embodiment of a bracket used in the embodiment shown in FIG. 5.
Figure 7:
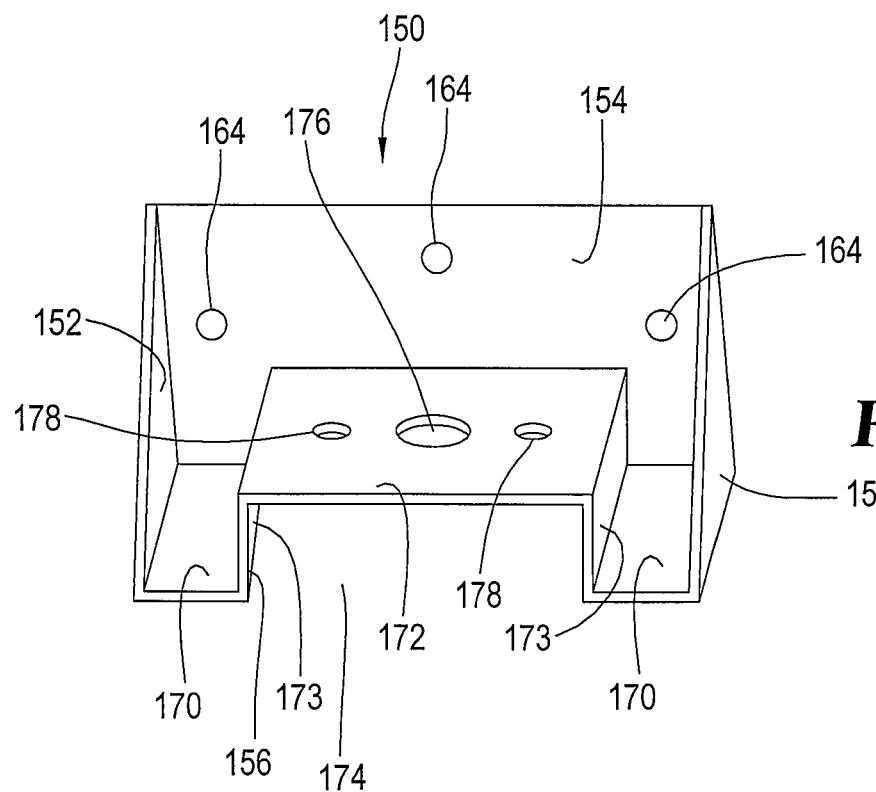
FIG. 7 is a perspective view of the embodiment of FIG. 6 in another orientation.
Figure 8:
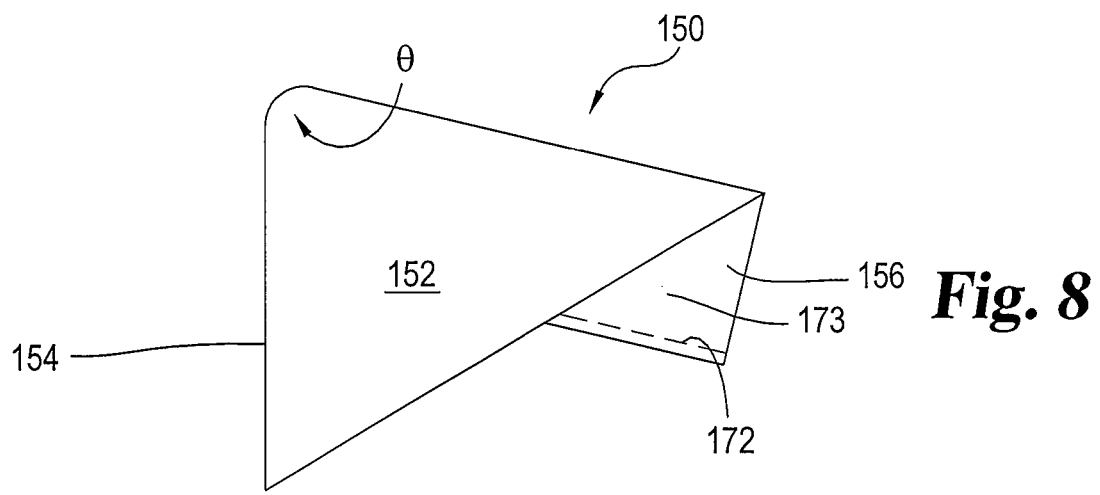
FIG. 8 is a side elevational view of the embodiment of FIG. 6.
Figure 9:
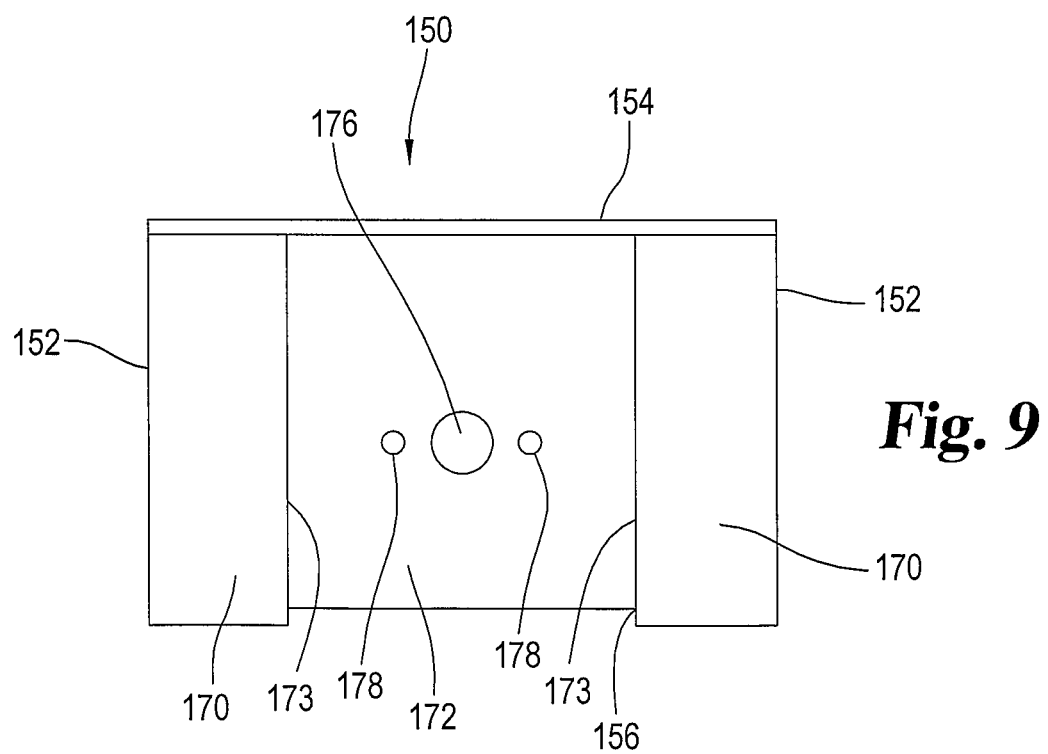
FIG. 9 is a top elevational view of the embodiment of FIG. 6.
Figure 10:
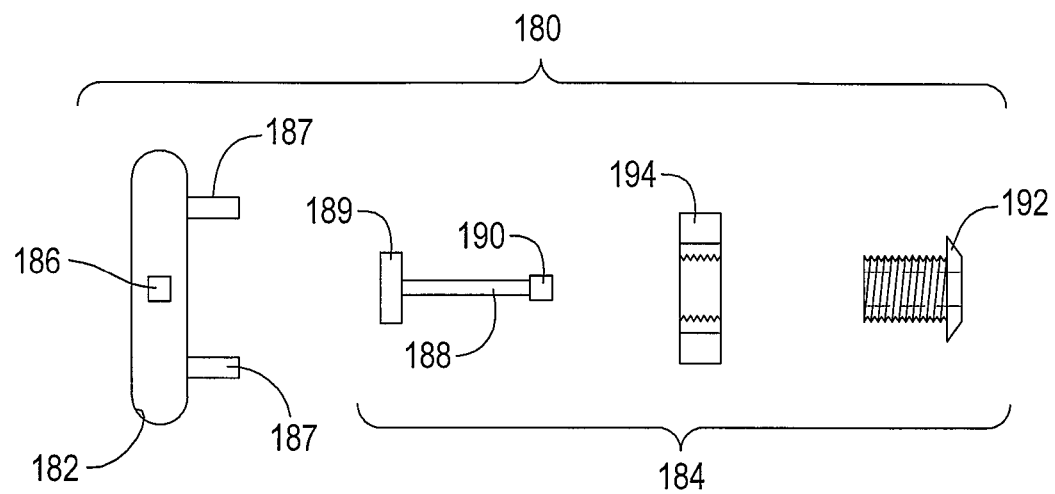
FIG. 10 is an exploded view of a portion of an embodiment of a connector shown in FIG. 5.
Figure 11:
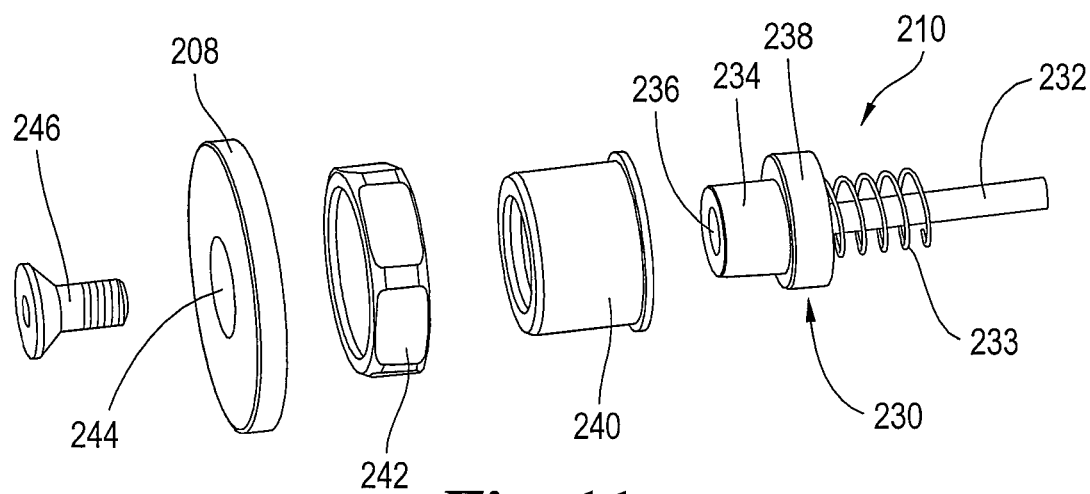
FIG. 11 is an exploded view of a portion of an embodiment of connecting structure shown in FIG. 5.

An exemplary connector or fastener 180 for use with system 100 is indicated in FIGS. 5 and 10. Fastener 180 includes a base 182 and an adjustable quarter-turn lock 184. Base 182 is elongated with a center slot 186 and side prongs 187 which snap into or are otherwise fixed within apertures 178 in a center panel 172 of a bracket 150. Base 182 is fixed to the inside of center panel 172, so that it faces away from cover 105 in use. Lock 184 includes an elongated member 188 with a cross-piece anchor 189 and head 190 (shown as a square head in the illustrated embodiment), a rounded internally-threaded case 192, and a nut 194. Cross-piece anchor 189 fits through slot 186 of base 182 in one orientation, but not if turned one-quarter turn from that orientation. Nut 194 is adjusted around case 192 to hold a portion of cover 105 between case 192 and nut 194. Cross-piece anchor 189 is held within case 192, and is inserted through aperture 176 in bracket 150 and slot 186 of base 182. Turning head 190 one-quarter turn moves cross-piece anchor 189 into the configuration in which it cannot pass through slot 186, anchoring cover 105 to bracket 150. Turning head 190 so that anchor 189 can pass through slot 186 allows disengagement of anchor 189 (and the rest of member 188) from base 182, allowing cover 105 to be removed from the respective bracket 105.

Rounded case 192 presents no ligature point to the extent it rises above the exterior surface of a portion of cover 105. Connector 180, and particularly an upper surface of case 192, is rounded and fits closely to or within cover 105 so that there is little to no projection from the surface of the valve cover, as this potentially acts as a ligature point. The actual connection between connector 180 and bracket 150 is spaced from cover 105 and any potential interference from a non-authorized person (e.g. a servicer). This feature allows cover 105 to be easily removed for cleaning and maintenance, but still provides adequate protection from unwarranted access to ligature points within cover 105.

System 100 further includes a push button assembly 200 for actuation of the flush valve V. Assembly 200 replaces a lever actuation handle as the method for flushing the toilet, as an exposed lever handle poses a ligature risk. Assembly 200 includes a button 202 inside a case 204 fitted in hole 132 in cover 105, e.g. with case 204 threaded into hole 132, and button 202 moveable within case 204. To button 202 is attached an adjustable extension 206, which in the illustrated embodiment is adjustable at multiple locations. Extension 206 abuts or otherwise connects to a pressure plate 208 coupled to a spring-loaded plunger 210 that activates the flush valve, as discussed further below.

Extension 206 includes a first threaded shaft 220 attached (threadedly or otherwise) to a foot 222 having a larger diameter than the crest diameter of shaft 220. A nut 224 is threaded on shaft 220, for adjustment up or down shaft 220. A larger threaded shaft 226 and associated nut 228 is outside shaft 220 and linked to button 202 and/or case 204. Via adjustments of one or both of nuts 224 and 228, and/or of foot 222, button 202 can be securely connected to pressure plate 208, e.g. to permit a minimum pressing distance or force on button 202 to activate flush valve V.

Commonly-available flush valves naturally have seals designed to prevent leakage through the usual handle-actuator provided with the valve. Instead of such a handle-actuator, system 100 includes plunger 210 having a head portion 230 and an elongated extension 232 to pass through seal(s) (not shown) and actuate the valve. Around extension 232 is a light-action spring 233 in this embodiment, which abuts head portion 230. Head portion 230 includes a cylindrical or part-cylindrical top 234 with a threaded aperture 236 and a wider flange 238. A socket assembly 240 and coupling nut 242 (which may be standard parts for or from the flush valve used) fit over head 230 of plunger 210, with nut 242 threaded onto flush valve V. Pressure plate 208 is a disk in this embodiment with a central hole 244 for accommodating a screw 246. In particular, hole 244 and the head of screw 246 may be complementarily formed so that screw 246 is countersunk in plate 208. Screw 246 threads into threaded aperture 236 of plunger 210, thereby holding plate 208 to socket 240 and plunger 210. These parts are connected to or through or associated with standard parts of valve V, such as seals or gaskets leading to the contact that operates valve V.

In the embodiment shown in FIG. 1, push button assembly 200 is directed to and through the upper part of side portion 114, but in other embodiments it may be differently oriented and/or placed at other positions on cover 105. Case 204 with button 202 inside is mounted to cover 105, and each are rounded with low profile to reduce or eliminate ligature risk. They seal opening 132 when case 204 and button 202 are in place. When button 202 is pushed, the pushing force is transmitted via extension 206 to pressure plate 208 and on to plunger 210. Extension 232 is forced into flush valve V, which is actuated to flush the toilet. When pressure on button 202 is released, spring 232 forces plunger 210 (and pressure plate 208 and extension 206) outward, returning button 202 to its original position.

In the embodiment shown in FIG. 5, there are three internal brackets 150. Brackets are attached to a solid surface, such as wall W, with a placement and spacing that fits the shape of cover 105. Each bracket 150 is attached to cover 105 using a respective connector 180 (FIGS. 5 and 10) fit through opening 120, 132 in cover 105 and into the connector opening 176 on the respective bracket 150. It is possible for more internal brackets 150 to be added, but in general it is desirable to have as few brackets 150 as possible, while ensuring that cover 105 is securely fixed to wall W with minimal chance of prying portions of cover 105 between brackets 150 away from wall W. More brackets and connection points create a greater risk of gaps between the wall and the cover or inexact or loose fittings, potentially creating ligature points or access to ligature points. A loose connector could possibly be removed, potentially providing an opening that could be used to pry off cover 105. For this reason, it may be desirable to have a small number of brackets used to secure cover 105 and to limit the number of connectors 180 that connect cover 105 to brackets 150.

The exemplary valve V shown with the illustrated embodiment of system 100 is wide at the top, to provide a flushing handle and incoming water supply, and are narrow at the bottom, having only a single pipe to direct water into fixture F. The shape of cover 105 is intended to fully cover valve V while resting flush on the surface of toilet fixture F. If bottom edge 140 were the same width as the upper portion 110, then parts of the bottom edge 140 would overhang the sides of the toilet fixture F. This presents the possibility of a person having access to ligature points by reaching underneath cover 105 and attaching ligature to flush valve V. Cover 105 in this embodiment with bottom edge 140 that is positioned flush on the surface of the toilet fixture F eliminates the possibility of access from beneath. To gain access to flush valve V, a person has to break the toilet fixture F or force cover 105 from wall W.

While the disclosure has been illustrated and described in detail in the drawings and foregoing description, the same is to be considered as illustrative and not restrictive in character, it being understood that only particular embodiments have been shown and described and that all changes, equivalents, and modifications that come within the spirit of the inventions defined by the following claims are desired to be protected. It will be understood that structures or other features described with respect to one particular embodiment or item may be used in connection or along with other features, items or embodiments included herein. All publications, patents, and patent applications cited in this specification are herein incorporated by reference as if each individual publication, patent, or patent application were specifically and individually indicated to be incorporated by reference and set forth in its entirety herein.

What is claimed is:

1. An anti-ligature toilet flush valve cover system for placement above a toilet fixture having a bowl and an upper surface adjacent the bowl, comprising:
   a monolithic valve cover including a T-shaped front portion having top and bottom parts, an upper portion, first and second S-shaped side portions and a bottom edge, wherein the top part of the front portion is wider than the bottom part of the front portion, each such portion having an interior surface;
   a plurality of internal brackets for mounting the valve cover to a solid surface, wherein each internal bracket has first and second side panels, a rear panel, and a U-shaped engagement piece extending between the side panels and from the rear panel, the engagement piece having two lateral arms and a recessed center panel joined to the lateral arms by side plates, wherein the lateral arms are adapted to contact the interior surface of one of the side portions or upper portion of the valve cover and wherein the recessed center panel includes an aperture and is offset from the lateral arms by at least 5 mm;
   a respective connector for each of the internal brackets, each such connector adapted for insertion through the valve cover to engage the aperture in the respective internal bracket at least 5 mm within the interior of the valve cover to attach the valve cover to the internal brackets;
   wherein the bottom edge is a continuous edge including an end of each of the side portions and an end of the front portion, and the entirety of the bottom edge defining an area smaller than the upper surface adjacent the bowl of the toilet fixture, so that the cover can be fixed with respect to the toilet fixture such that no portion of the bottom edge extends beyond the upper surface adjacent the bowl of the toilet fixture; and,
   wherein the internal brackets contact the valve cover on the upper portion and at the bottom part of the side portions.

2. The system of claim 1, wherein the connectors are quarter turn fasteners.

3. The system of claim 1, wherein the plurality of internal brackets includes a maximum of three internal brackets.

4. The system of claim 1, further comprising a push button positioned through the valve cover and connected to an activation assembly for activating the toilet flush valve.

5. The system of claim 4, further comprising a case for the push button threaded through the cover, and wherein the activation assembly includes an adjustable extension.

6. The system of claim 5, further comprising a pressure plate coupled to a spring-loaded plunger that activates the flush valve, and wherein the adjustable extension connects to the pressure plate, so that pushing force on the push button is transmitted via the adjustable extension to the pressure plate and plunger.

7. The system of claim 6, wherein the plunger has a head portion and a shaft, the head having a threaded opening, and further comprising a screw extending through the pressure plate and threading into the head of the plunger, to fix the pressure plate and the plunger together, and wherein the shaft activates the flush valve.

8. The system of claim 5, wherein the adjustable extension includes a first threaded shaft connected to a foot and a second threaded shaft connected to the push button, each such shaft having a respective nut whereby the extension can be adjusted.

9. The system of claim 8, wherein the foot is movable along the first threaded shaft to provide an additional adjustment for the adjustable extension.

10. The system of claim 1, wherein the upper portion of the valve cover is at least partly planar, and wherein the first and second side portions of the valve cover each have a first at least partly planar area adjacent the top part of the front portion and a second at least partly planar area adjacent the bottom part of the front portion.

11. The system of claim 10, wherein the valve cover has only four holes through its portions, including a first, second and third holes each for accommodating a respective one of the connectors and a fourth hole for accommodating a push button, the first hole being through the first side portion of the valve cover in the planar area adjacent the bottom part of the front portion, the second hole being through the second side portion of the valve cover in the planar area adjacent the bottom part of the front portion, and the third hole being through the planar part of the upper portion of the valve cover.

12. The system of claim 11, wherein the fourth hole is through the first side portion of the valve cover in the planar area adjacent the top part of the front portion, and further comprising a push button mechanism extending through the fourth hole but not presenting a ligature point.

13. The system of claim 1, wherein the valve cover includes a back edge that is continuous and includes an end of each of the side portions and an end of the upper portion, the back edge facing away from the front portion, and wherein the back edge is adapted to lie flush against a wall from which the toilet fixture extends.

14. The system of claim 13, wherein the lateral arms and the rear panel of the internal brackets form an acute internal angle, and the valve cover has an exterior, so that the exterior of the valve cover at the location of the internal brackets forms an obtuse internal angle with the wall.

15. The system of claim 1, wherein the front portion of the valve cover is planar and non-perpendicular to the upper portion of the valve cover and to the first and second side portions of the valve cover.

* * * * *